United States Patent [19]

Balazs

[11] 4,300,719
[45] Nov. 17, 1981

[54] STEAM TRAPS

[75] Inventor: Les G. Balazs, Parma Heights, Ohio

[73] Assignee: The Clark-Reliance Corporation, Cleveland, Ohio

[21] Appl. No.: 122,829

[22] Filed: Feb. 20, 1980

[51] Int. Cl.³ .............................................. F16T 1/44
[52] U.S. Cl. ...................................... 236/53; 236/64; 236/73 A
[58] Field of Search .................. 236/53, 56, 58, 93 A, 236/99 J, 64, 42; 137/510

[56] References Cited

U.S. PATENT DOCUMENTS

| | | | |
|---|---|---|---|
| 1,541,929 | 6/1925 | Eggleston | 236/64 X |
| 1,897,753 | 2/1933 | Cryer | 236/53 |
| 2,117,056 | 5/1938 | Dunn | 236/53 X |
| 2,542,969 | 2/1951 | Clark et al. | 236/53 |
| 2,545,107 | 3/1951 | Peper | 236/64 X |
| 3,685,731 | 8/1972 | Fujiwara | 236/55 |
| 3,785,555 | 1/1974 | Fujiwara | 236/53 |

Primary Examiner—William E. Tapolcai, Jr.
Attorney, Agent, or Firm—Yount & Tarolli

[57] ABSTRACT

The disclosure relates to an improved temperature responsive control arrangement. It includes a valve member, a chamber, and a bellows disposed in said chamber for controlling the position of the valve member in response to the temperature of fluid flowing through the chamber. The arrangement is particularly suited for use in steam traps. There are surfaces in the chamber for distributing fluid flowing through the chamber around the bellows to promote rapid expansion and contraction of said bellows with changes in temperature of the fluid flow through said chamber. The chamber has an outlet centrally located at one end thereof, and the distributing surfaces include a plurality of fluid inlets at the end of the chamber opposite from the outlet, the fluid inlets being distributed about the periphery of the chamber. Each of the fluid inlets conducts a flow of fluid into the chamber and each of the inlets is located so that a first portion of the fluid flowing through the inlet into said chamber is deflected by impact with the bellows across a lower end face of the bellows. The distributing surfaces further include a plurality of channels, each of the channels being associated with one of the inlets and forming a continuation thereof. Each of the channels at least partially defines a path along the edge of the bellows for a second portion of the fluid flowing through one of the inlets. Each of the channels has a deflector surface for deflecting the fluid flowing in the channel across an upper end face of the bellows. The deflector surfaces include bevelled end faces of each of the channels.

16 Claims, 5 Drawing Figures

STEAM TRAPS

BACKGROUND OF THE INVENTION

The present invention relates to steam traps and in particular to a float-type steam trap having an improved temperature responsive control arrangement.

Float-type steam traps are well known and are effective in applications where the trap is in constant use. In these traps a float controls a flow of water from a float chamber through a valve seat in the bottom of the chamber as the liquid level within the chamber rises and falls. When a system using a float trap is in intermittent service, it has been found advantageous to purge gasses accumulated while the system was out of service through an additional valve in the top of the trap. The gas purging valve is open during start up of the system and is usually controlled by a thermostatic element.

The thermostatic element allows flow through the upper valve during start up of the system to purge air and other gasses from the lines. When steam is first introduced to the system, it pushes the cold, collected gasses in front of it. When these gasses reach the steam trap, they flow through the upper valve and are vented into the atmosphere or elsewhere. Once steam reaches the trap, the thermostatic element closes the upper valve. It is important that the thermostatic element operate quickly and effectively to seal the valve so that the valuable steam is not wasted.

SUMMARY OF THE INVENTION

The present invention provides a float-type steam trap having a temperature responsive control arrangement which is extremely effective in closing a valve member against an upper valve seat upon the arrival of steam in a float chamber. The control arrangement includes a bellows-type thermostatic element which is positioned in a separate bellows chamber above the float chamber. The bellows chamber has plural inlets for collected gasses and steam at its lower end and a single outlet through a valve seat at its upper end. One end portion of the bellows is fixed to the lower end of the bellows chamber, and a valve member is connected to the top of the bellows. With this arrangement, steam must flow up around and past the bellows before it can escape. Thus, the bellows can start expanding before any steam has reached the valve in the top of the bellows chamber.

The bellows chamber is shaped to assure even distribution of steam around the bellows, and thus rapid and even expansion of the bellows. The inlets to the bellows chamber are arranged evenly around the periphery of the circular base of the bellows and are partially aligned with the edge of the bellows. Some of the steam flowing in through each of the inlets is deflected by the bottom of the bellows to flow across it. An open channel is associated with each of the inlets and forms a continuation thereof. Each channel extends axially along the side walls of the bellows chamber. A portion of the steam flowing through each of the inlets which was not deflected by the bottom of the bellows is guided along the length of the bellows by the open channels.

Each of the open channels terminates adjacent the upper end portion of the bellows chamber with a bevelled end face which serves to deflect the steam out of the channel and across the upper end of the bellows.

By the use of a number of inlets positioned in this manner and the use of channels with bevelled ends as described, the bellows is uniformly surrounded by steam. This means the bellows expands evenly and more rapidly than it would if steam impinged only on one part of the bellows. Thus, the present invention provides a float-type steam trap with an effective and rapidly operating temperature responsive control arrangement.

BRIEF DESCRIPTION OF THE DRAWINGS

These and other features and advantages of the present invention will become more apparent to those skilled in the art to which it pertains upon reading the following specification together with the accompanying drawings in which.

DESCRIPTION OF PREFERRED EMBODIMENT

Figure 1:
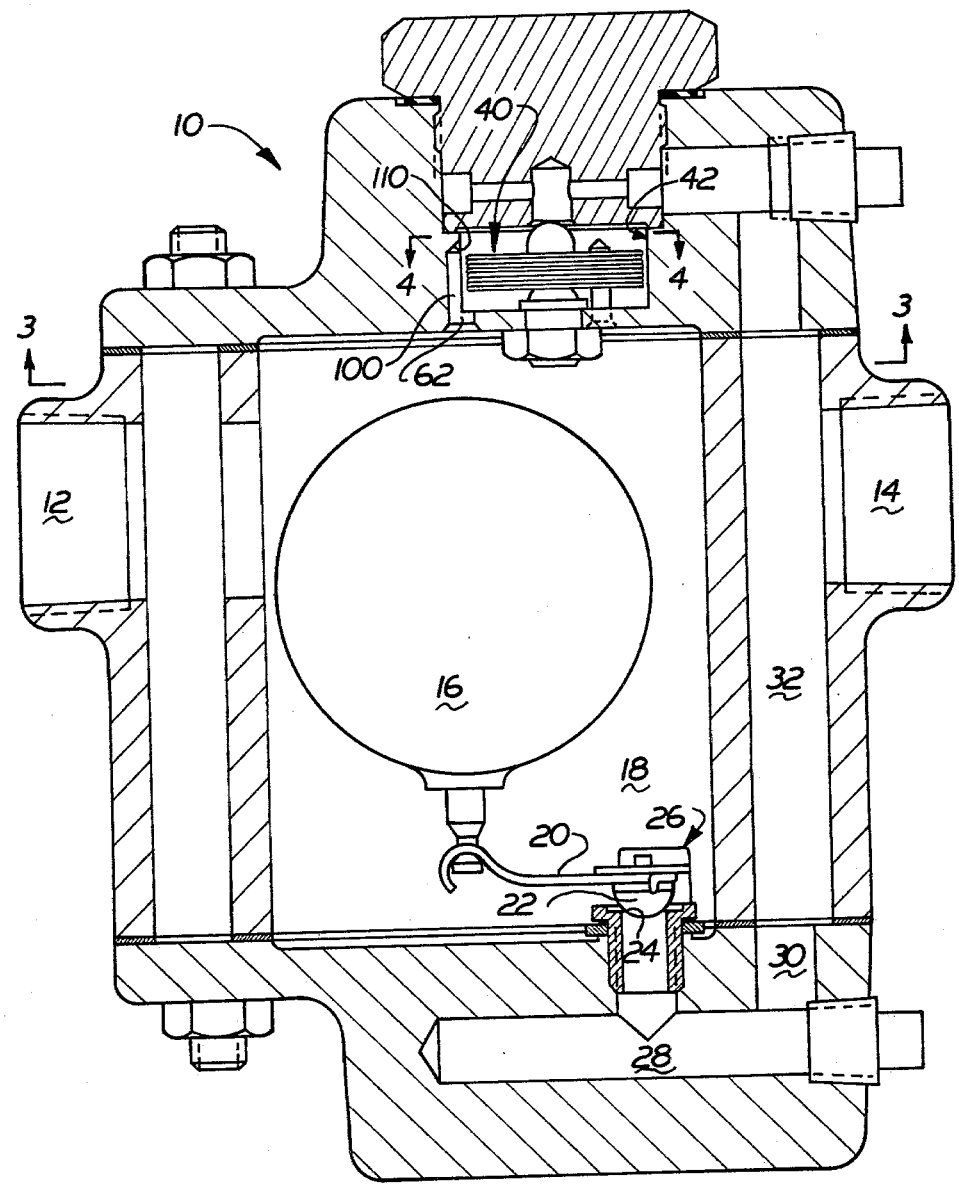
FIG. 1 is a cross sectional elevational view of a float-type steam trap having a temperature responsive control arrangement constructed according to the present invention.

The present invention is illustrated in FIG. 1 in connection with a float-type steam trap 10. The steam trap 10 includes an inlet 12 and an outlet 14 which are threaded so that the steam trap may be connected by suitable pipes (not shown) to a system utilizing steam. The steam trap 10 includes a float 16 located inside a float chamber 18 and connected by a lever 20 to a valve member 22. The lever 20, valve member 22, and a valve seat 24 cooperate to form a valve assembly 26. The valve assembly 26 is in fluid communication with the outlet 14 via passages 28, 30, and 32.

The float 10 and valve assembly 26 operate in a conventional manner with the rising of the float 16 opening the valve assembly to allow condensate to flow out the outlet 14 and the falling of the float closing the valve assembly to prevent the escape of steam. The float chamber 18 serves as a separating chamber with liquid settling to the bottom and gasses rising to the top. In this respect the steam trap 10 is similar to a float trap disclosed in pending U.S. Patent Application Ser. No. 095,152, filed Nov. 19, 1979.

Figure 2:
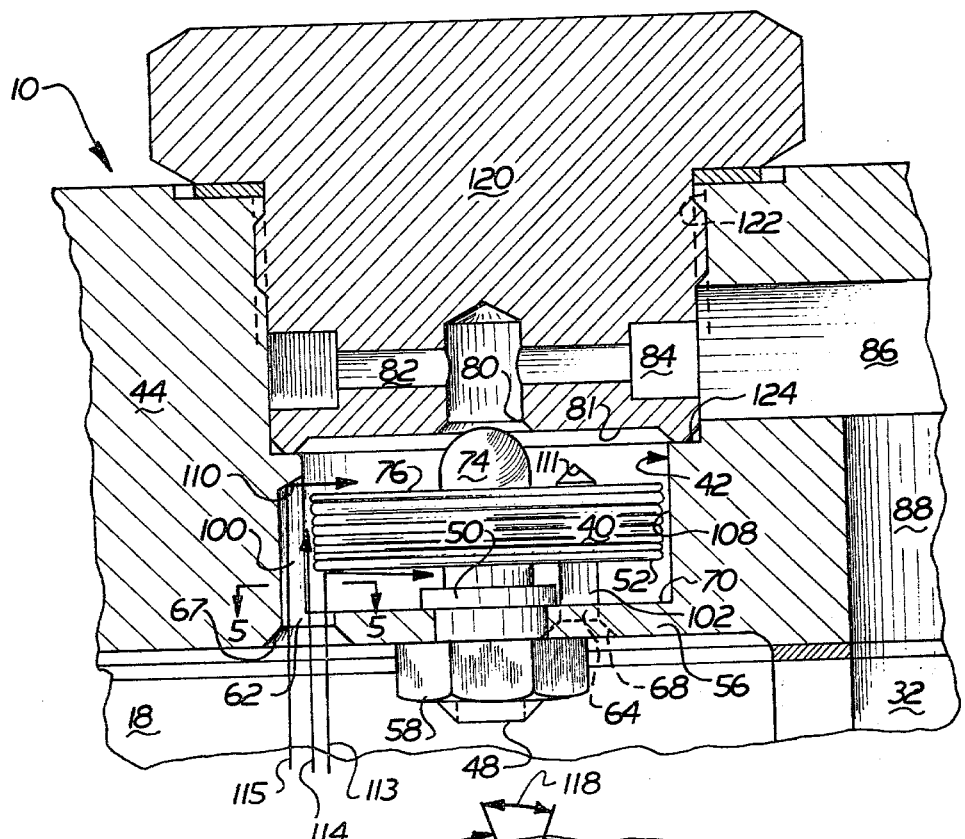
FIG. 2 is an enlarged view of the temperature responsive control arrangement of FIG. 1.

To purge gasses which may have accumulated in pipes or other system components upstream of the inlet 12 during periods when the system is free of steam or not in use, the steam trap 10 includes a thermostatic, temperature responsive element 40. The thermostatic element 40 is a bellows formed of corrosion resistant stainless steel and filled with distilled water or other volatile fluid. The bellows 40 is generally cylinrical and expands axially (i.e. vertically as viewed in FIGS. 1 and 2) when the temperature of the fluid within reaches its boiling point. The bellows 40 is known as a pressure balanced bellows, and when used in a steam trap, it follows the saturated steam curve, opening when steam is not present and closing when steam is present, regardless of the pressure. Its mode of operation and the factors relating to selection of an appropriate volatile fluid are well known in the steam trap art.

The bellows 40 (FIG. 2) is located within a bellows chamber 42 located in the member 44 which forms the top of the housing of the steam trap 10. A threaded shaft 48 having a collar 50 is fixed to the lower end 52 of the bellows 40. The shaft 48 extends through a wall 56 which separates the bellows chamber 42 from the float chamber 18. A nut 58 is threaded onto the shaft 48, and together they hold the bellows 40 in place a fixed distance above the bottom 70 of the chamber 42.

Figure 3:
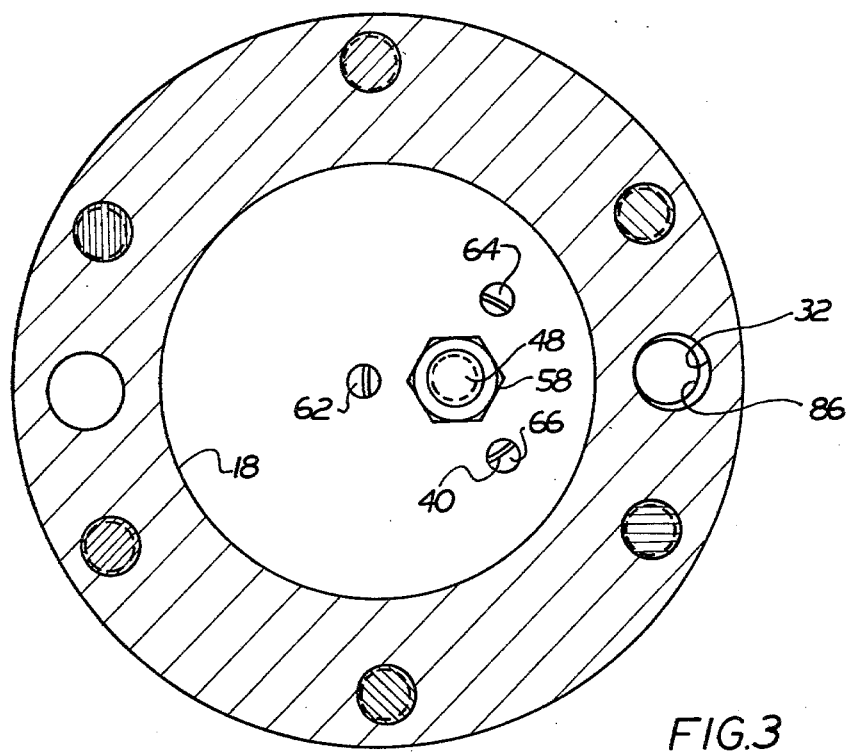
FIG. 3 is a view taken along line 3—3 of FIG. 1 illustrating the spatial relationship between a plurality of inlets to a bellows chamber in the thermostatic control arrangement.

The bellows chamber 42 is cylindrical and oriented with its axis generally vertical. The bellows chamber 42 is slightly larger in diameter than the bellows 40 and three inlets 62, 64, 66 are located around the periphery of the bottom 70 of the bellows chamber 42. The inlets 62, 64 and 66 extend through the wall 56 and admit collected gasses from the float chamber 18 to the bellows chamber 42. The use of three inlets 62, 64 and 66 (FIG. 3) assures an even distribution of steam about the circumference of the bellows 40. However, the present invention is not limited to three inlets; it is contemplated that more or fewer inlets could be utilized without deviating from the gist of the present invention.

The inlets 62, 64 and 66 (FIG. 3) are located radially so that they partially overlap or are partially aligned with the bellows 40. For this reason, when steam enters the bellows chamber 42 through the inlets 62, 64 and 66, a portion of the steam through each inlet impinges on the bottom 52 of the bellows 40 and is deflected across it. This provides an even distribution of steam across the bottom 52 of the bellows 40 and thus contributes to even and rapid heating of the bellows.

Each of the inlets 62, 64, and 66 includes a frustoconical portion 67, 68, respectively (the frustoconical portion of inlet 66 is not shown, but it is similar). These frustoconical portions 67, 68 of the inlets 62, 64, and 66 are formed by the tip of a drill, and serve to channel steam from the float chamber 18 into the inlets. Further, these frustoconical portions 67, 68, together with the rather short axial extent of the inlets 62, 64, and 66 proper, cause the steam entering the chamber 42 to expand like a spray leaving a nozzle when once it is in the chamber 42. This adds to the rapid, even heating of the bellows 40.

The bellows 40 (FIG. 2) carries a hemispherical valve member 74 on its uppper end 76. The valve member 74 cooperates with a circular valve seat 80 in the top 81 of the bellows chamber 42 to control the flow of gasses and steam from the bellows chamber 42. When the bellows 40 is contracted, the valve member 74 is spaced from the seat 80, and gasses are free to flow through passages 82, 84, 86, 88 and 32 into the outlet 14. Because the valve seat 80 is located in the top 81 of the bellows chamber 42, and because the inlets 62, 64 and 66 are located in the bottom of the bellows chamber with the bellows 40 between the inlets and the valve seat, any steam entering the trap 10 must flow past the bellows before it reaches the valve seat or the outlet 14. Accordingly, the bellows 40 has a maximum opportunity to become heated and to close the valve member 74 against the valve seat 80 before any steam escapes.

Figure 4:
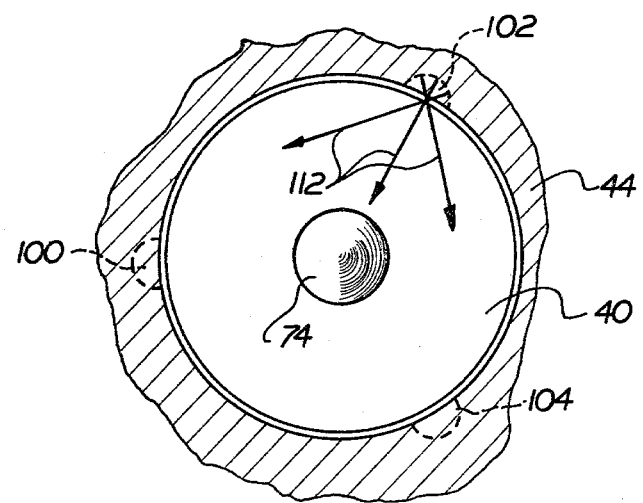
FIG. 4 is a view taken along line 4—4 of FIG. 1 illustrating the relationship between a bellows and a plurality of channels which distribute steam around the bellows.

The chamber 42 inclues three elongated openings or open channels 100, 102 and 104 (FIGS. 2 and 4) which form continuations of the inlets 62, 64 and 66. These open channels have a semi-cylindrical shape and are formed as recesses in the otherwise cylindrical wall 108 of the bellows chamber 42. The open channels 100, 102 and 104 extend parallel to the axis of the bellows chamber and assist in conducting steam upward in the chamber 42 toward the top 81 thereof.

The open channels 100, 102 and 104 have end faces 110 and 111 which serve to divert or deflect the steam from the channels radially across the top 76 of the bellows. Each of the channels 100, 102 and 104 has a bevelled or conical end face 110, 111 (the end face of the channel 104 is not shown but is similar). The end faces 110 and 111 have the shape of a cone which has been cut by a plane intersecting its axis. As used in this specification (including the appended claims), the term bevelled when applied to end faces 110 and 111 is used to include any surface transverse to the axis of channels 100 and 102 and which diverts or deflects fluid flowing in the channels to thereby change the direction of fluid flow.

The conical or bevelled end faces 110 and 111 deflect the steam radially across the top 76 of the bellows assuring an even and uniform distribution of steam across that surface. This assures even and rapid heating of the bellows 40, and thereby minimizes the loss of valuable steam. Because these end faces 110 and 111 are conical they direct the steam in an expanding spray (as indicated by the arrows 112 in FIG. 4) across the top 76 of the bellows 40.

It is clear from the above that a portion (indicated by the arrow 113) of the steam entering through an inlet (e.g., inlet 62) is deflected by the bottom 52 of the bellows 40. Another portion (indicated by the arrow 114) proceeds straight through the inlet 62 up the side of the bellows 40 and swirls around the sides of the bellows because of natural turbulence in the flow. Yet a third portion (indicated by the arrow 115) of the steam entering through the inlet 62 is aligned with the open channel 100. This portion is deflected by the bevelled or conical end face 110 and travels radially across the top surface 76 of the bellows 40.

Figure 5:
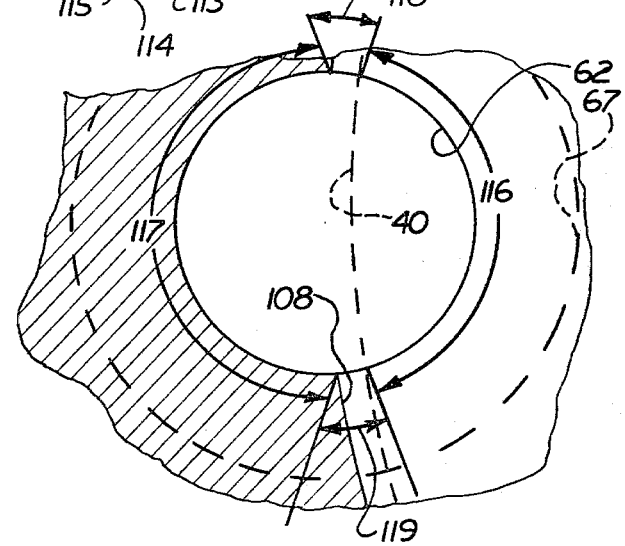
FIG. 5 is an enlarged view taken along line 5—5 of FIG. 2 illustrating the spatial relationship between various portions of one of the openings and the bellows which form part of the temperature responsive control arrangement of the present invention.

FIG. 5 illustrates the various portions of the fluid flow through inlet 62. The portion of fluid flow flowing through arcuate segment 116 of inlet 62 is directed at the bottom 52 of the bellows 40. This portion is indicated by the arrow 113 in FIG. 2. The portion of the fluid flow through arcuate segment 117 of opening 62 enters the channel 100 and is guided by the surfaces of the channel until it reaches the bevelled or conical end face 110. This portion of the fluid is indicated by arrow 115 in FIG. 2.

The remaining portion of the flow is defined by arcuate portions 118 and 119, the perimeter of bellows 40 and the edge 108 of bellows chamber 42 define the bounaries between the portion of the fluid flow which hits the bottom 52 of the bellows, the portion which enters channel 100, and the remaining portion of the flow. The remaining portion is indicated by the arrows 114 in FIG. 2. and flows up the sides of the bellows 40 where natural turbulence causes it to spread. It will be understood that the various arcuate portions of the remaining inlets 64 and 66 function in the same way as the arcuate portions 116, 117, 118 and 119 of inlet 62 to direct one portion of the flow toward the bottom 52 of the bellows, another portion into a corresponding channel 102 and 104, and a third portion up the side of the bellows 40.

The top 81 (FIG. 2) of the bellows chamber 42 is provided by the bottom surface of a bellows cap 120.

The bellows cap 120 is received in a threaded passage 122 in the top 42 of the steam trap 10. A shoulder 124 within this passage locates the cap 120 axially with respect to the bellows chamber 42.

The bellows cap 120 includes annular recess 84 in its periphery which communicates both with the valve seat 80 and the passage 86 regardless of the angular orientation of the bellows cap. The annular recess 84 in the outside surface of bellows cap 120 is connected with a central axial bore 130 by diametrical bore 82. When the bellows cap 120 is tightened in place, its angular arrangement is irrelevant, because the annular recess 84 is always aligned with the bore 86 in the top 44 of the steam trap 10.

The top 44 including bellows 40 and bellows chamber 42 with the steam distributing features of the present invention are not limited to use with the trap 10 which is a float-type trap. The top 44 including the features of the present invention may be used on other traps such as those disclosed in the previously mentioned U.S. Patent Application Ser. No. 095,152, filed Nov. 19, 1979, which is assigned to the assignee of the present invention. Further, it is specifically contemplated that the features of the present invention could be utilized in steam traps which utilize a bellows-type thermostatic element as the sole means for regulating flow through the trap.

Thus, it is clear that the present invention provides a float-type steam trap 10 having a thermostatic element 40 which is extremely effective in closing valve member 74 aganst upper valve seat 80 upon the passage of steam through the float chamber 18. A bellows-type thermostatic element 40 is utilized, and it is possible in a separate bellows chamber 42 above the float chamber. The bellows chamber 42 has plural inlets 62, 64, and 66 for collected gasses and steam at its lower end 70 and a single outlet through a valve seat 80 at its upper end. One end portion 52 of the bellows 40 is fixed to the lower end of the bellows chamber, and a valve member 74 is connected to the top 76 of the bellows. With this arrangement steam must flow up around and past the bellows 40 before it can escape. Thus, the bellows 40 can start expanding before any steam has reached the top 81 of the bellows chamber 42.

The arrangement of the present invention assures even distribution of steam around the bellows 40, and thus rapid and even expansion of the bellows. The inlets 62, 64, and 66 to the bellows chamber 42 are arranged evenly around the periphery of the circular bottom 52 of the bellows 40 and are partially aligned with the edge of the bellows. Some of the steam flowing in through the inlets 62, 64, and 66 is deflected by the bottom 52 of the bellows to flow across it. An open channel 100, 102, and 104 is associated with each of the inlets 62, 64, and 66 and forms a continuation thereof. Each channel 62, 64, and 66 extends axially along the side walls 108 of the bellows chamber 42. A portion 116 of the steam flowing through each of the inlets which was not deflected by the bottom of the bellows is guided along the length of the bellows by the open channels 100, 102, 104. Each of the open channels 100, 102, and 104, terminates adjacent the upper end 76 of the bellows chamber with a bevelled end face 110, 111 which serves to deflect the steam out of the channel and across the upper end 76 of the bellows 40. By the use of a number of inlets 60, 62, and 64 positioned in this manner and the use of channels 100, 102, and 104 with bevelled ends 110 and 111 as described, the bellows 40 is uniformly surrounded by steam. This means the bellows 40 expands evenly and more rapidly than it would if steam impinged only on one part of the bellows. Thus, the present invention provides a float-type steam trap 10 with an effective and rapidly operating thermostatic element 40.

What is claimed is:

1. A steam trap comprising a housing, first port means in said housing through which fluid is admitted to said housing and second port means in said housing through which fluid exits said housing, surface means defining a separating chamber in said housing in which liquid portions and gasseous portions of a fluid flowing through said first port means are separated, said separating chamber being in fluid communication with said first and second port means, liquid level responsive valve means disposed in said separating chamber for controlling the flow of liquid fluid from said chamber to said second port means, a second chamber, said second chamber having spaced top and bottom surfaces and a perimeter wall connecting said top and bottom surfaces, inlet passage means for conducting gasseous fluid from said separating chamber means to said second chamber, outlet passage means for conducting gasseous fluid from said second chamber to said second port means, and temperature responsive valve means for controlling the flow of fluid through said outlet passage means, said outlet passage means including a valve seat, said valve means comprising a valve member, and temperature responsive means connected with said valve member for urging said valve member against said valve seat in response to the presence of steam in said gasseous fluid to block the flow of gasseous fluid from said second chamber to said second port means, said inlet passage means including means for exposing all sides of said temperature responsive means to a flow of gasseous fluid entering said second chamber through said inlet means, said means for exposing all sides of said temperature responsive means including an opening in said bottom surface of said second chamber through which gasseous fluid enters said second chamber, an elongated channel extending from said opening in said bottom surface of said second chamber to a location below said top surface of said second chamber and above the upper surface of said temperature responsive means when said valve means is open, and surface meand disposed at said location above the upper surface of said temperature responsive means when said valve means is open and below said top surface of said second chamber and for directing a flow of gasseous fluid from said elongated channel along a path extending across the upper surface of said temperature responsive means.

2. A steam trap as set forth in claim 1 wherein said temperature responsive means includes a bellows, and a volatile fluid in said bellows.

3. A steam trap as set forth in claim 2 wherein said bellows includes axially opposite first and second end faces and axially expandable side walls connecting said first and second end faces, said first and second end faces and said expandable side walls include said top, bottom and side surfaces of said temperature responsive means, and said valve member is fixedly connected with said first end face of said bellows.

4. A steam trap as set forth in claim 3 wherein said means for exposing all sides of said temperature responsive means includes a plurality of said openings in said bottom surface of said second chamber.

5. A steam trap as set forth in claim 4 wherein said plurality of openings are positioned around the periphery of said second chamber.

6. A steam trap as set forth in claim 3 wherein said second chamber is disposed above said separating chamber and said valve seat is disposed in said top surface of said second chamber.

7. A steam trap as set forth in claim 1 wherein said elongated channel extending from said opening in said bottom surface of said second chamber to a location above the upper surface of said temperature responsive means and below said top surface of said second chamber includes a recess formed in said perimeter wall of said second chamber.

8. A stream trap comprising a valve member, a chamber, bellows means disposed in said chamber for controlling the position of said valve member in response to the temperature of fluid flowing through said steam trap, said bellows means including upper and lower end faces, surface means in said chamber for distributing fluid flowing through said chamber around said bellows means to promote rapid expansion and contraction of said bellows means with changes in temperature of the fluid flow through said chamber, said chamber having an outlet centrally located at one end thereof, said surface means including a plurality of fluid inlets at the end of said chamber opposite from said outlet, said fluid inlets being distributed about the periphery of said chamber, each of said fluid inlets conducting a flow of fluid into said chamber and each of said inlets being located so that a first portion of the fluid flowing through said inlet into said chamber is deflected by impact with said bellows means across the lower end face of said bellows means, said surface means further including a plurality of channel means, each of said channel means being associated with one of said inlets and forming a continuation thereof, each of said channel means at least partially defining a path along the edge of said bellows means for a second portion of the fluid flowing through one of said inlets, and each of said channel means having deflector means for deflecting the fluid flowing in said channel means across the upper end face of said bellows means, said deflector means including a bevelled end face of each of said channel means located below said one end of said chamber.

9. An apparatus as set forth in claim 8 wherein each of said fluid inlets comprises a first portion which has a substantially cylindrical wall and a second portion which is frustoconical and has side walls diverging from said substantially cylindrical wall of said first portion.

10. An apparatus as set forth in claim 9 wherein said first and second portions of each of said inlets are immediately adjacent each other and arranged so that fluid flowing into said chamber flows first through said second portion and then through said first portion of each of said fluid inlets.

11. An apparatus as set forth in claim 9 wherein said first and second portions of each of said inlets are coaxial.

12. A steam trap as set forth in claim 8 further including means for positioning said lower end face of said bellows a fixed distance from the bottom of said chamber, and said valve member is connected with said top of said bellows.

13. A temperature responsive control arrangement for use in a steam trap, said arrangement comprising a body member having an axially extending fluid chamber into which a fluid is introduced, a bellows disposed in said chamber, said bellows expanding axially in the presence of steam in the fluid in said chamber, said bellows having a first axial end face connected with a first end portion of said fluid chamber, a valve member connected with a second and axially opposite end face of said bellows, a valve seat in a second end portion of said chamber axially opposite from said first end portion and defining a fluid outlet from said chamber, said bellows expanding axially to urge said valve member sealingly against said valve seat when the fluid in said chamber includes steam thereby to block the flow of fluid through said outlet, and a plurality of passage means for distributing the fluid coming into said chamber about said bellows, each of said passage means including a circular inlet in said first end portion of said chamber and partially aligned with said first end face of said bellows whereby a portion of the incoming fluid flowing through said inlet is deflected by said first end face, open channel means for conducting a portion of the fluid flowing through said inlet along the length of said bellows, and surface means at one end of each of said channels transverse to the axis of said bellows for deflecting the fluid flowing in said channel across said second end face of said bellows, said surface means being located between said first and second end portions of said chamber.

14. A steam trap comprising a housing, a separating chamber in said housing, an inlet for admitting steam and condensate into said separating chamber, an outlet from said chamber, said outlet being located in a lower portion of said chamber, float valve means operative in response to the presence of condensate in said separating chamber to an open condition to allow the condensate to flow through said outlet, a second chamber having axially spaced first and second end surfaces and a perimeter surface connecting said end surfaces, a plurality of passage means extending between said separating chamber and said first end surface of said second chamber for conducting steam into said second chamber, an outlet from said second chamber located in said second end surface thereof, bellows valve means disposed in said second chamber and axially expandable in response to the presence of steam in said second chamber to close said outlet from said second chamber, said perimeter surface of said second chamber being disposed closely adjacent said bellows valve means and having surface means defining a plurality of recesses in said perimeter surface, each of said recesses being aligned with one of said plurality of passages and each of said recesses extending from said first end surface of said second chamber toward said second end surface along the axial length of said bellows valve means for transmitting a portion of the steam passing from said first chamber to said second chamber along the axial length of said bellows valve means and for enveloping said bellows valve means in the steam to cause rapid expansion thereof.

15. A steam trap as set forth in claim 14 wherein an end face of said bellows valve means is partially aligned with each of said plurality of passage means between said first chamber and said second chamber to intercept a portion of the steam passing from said first chamber to said second chamber.

16. A steam trap as set forth in claims 14 or 15 wherein each of said recesses in the perimeter surface of said second chamber includes a bevelled end surface located between said first and second end surfaces of said second chamber to deflect steam from said recess toward said bellows valve means.

* * * * *